June 15, 1937. J. M. RANGER 2,084,291
TRAILER HITCH
Filed April 25, 1936 4 Sheets-Sheet 4

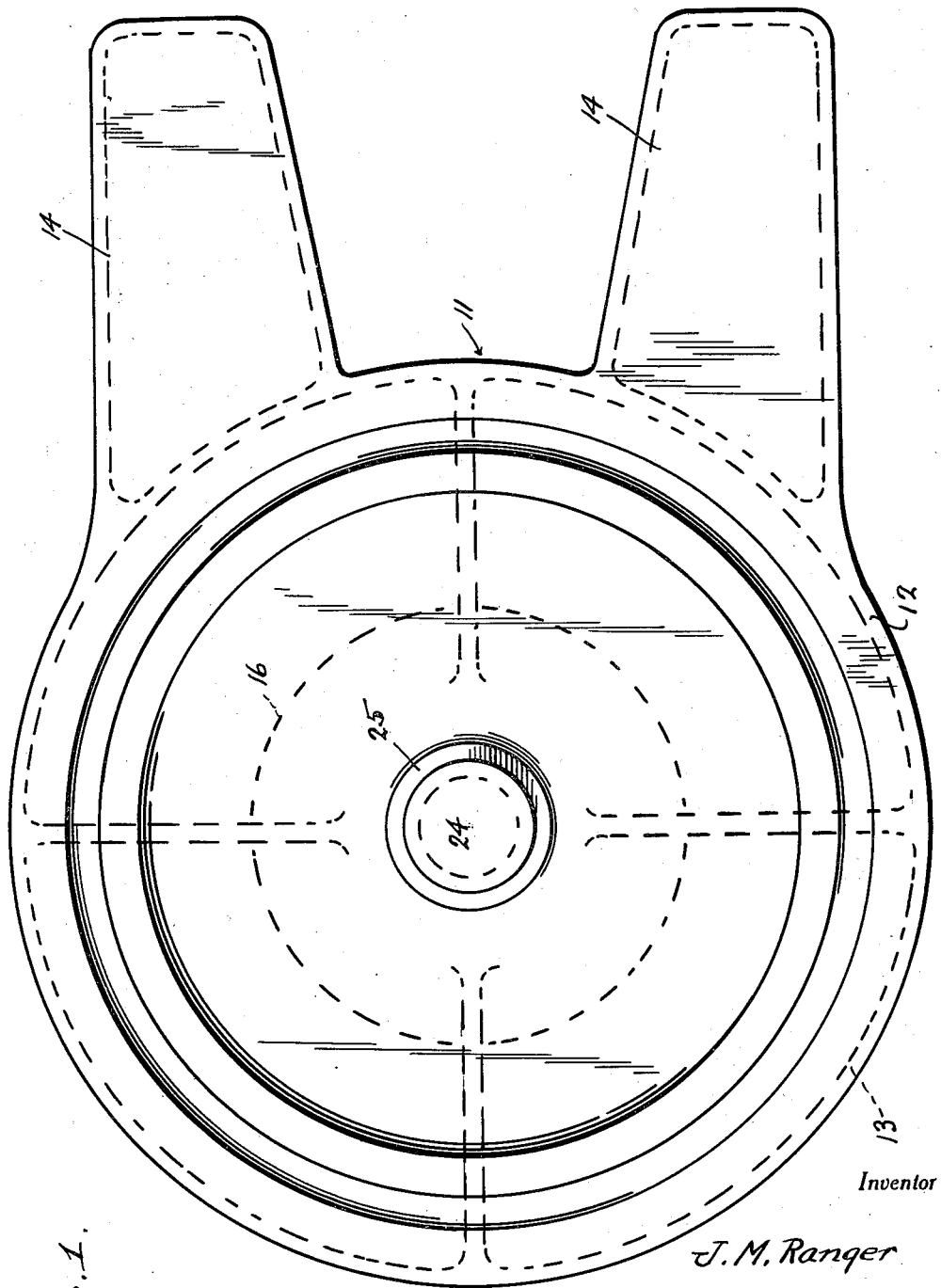

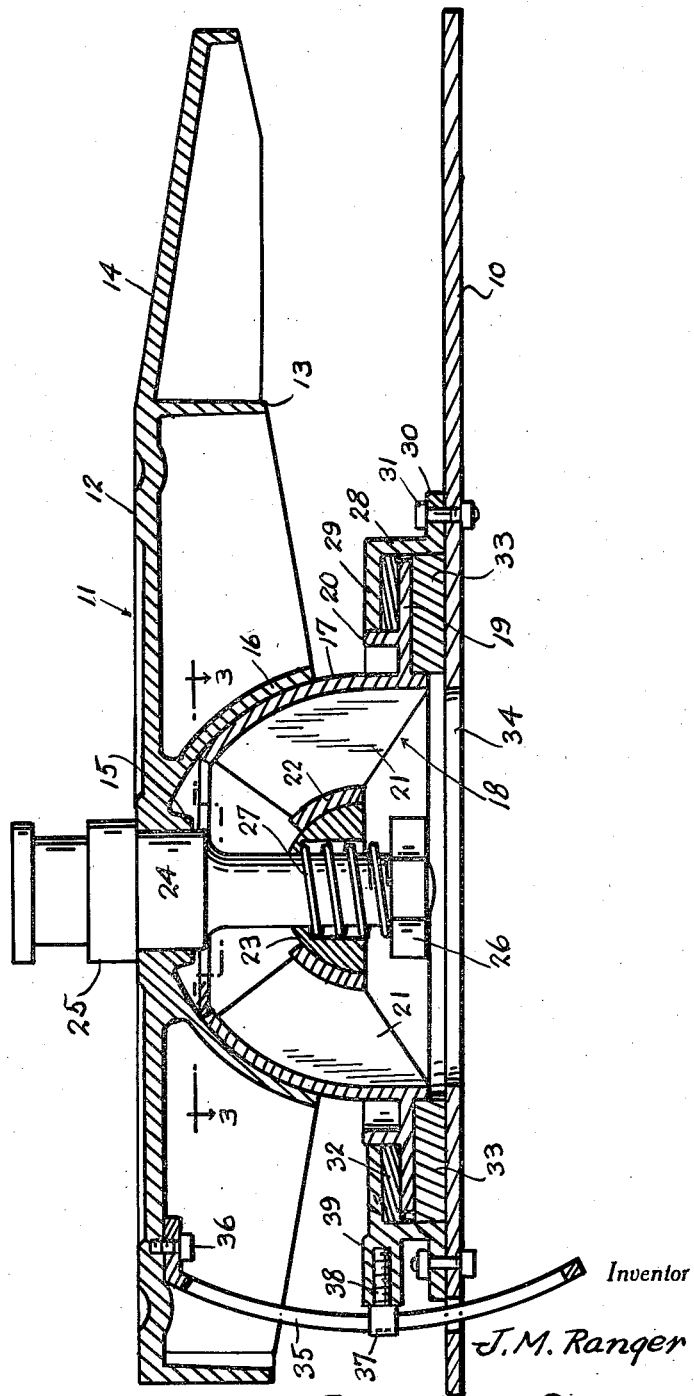

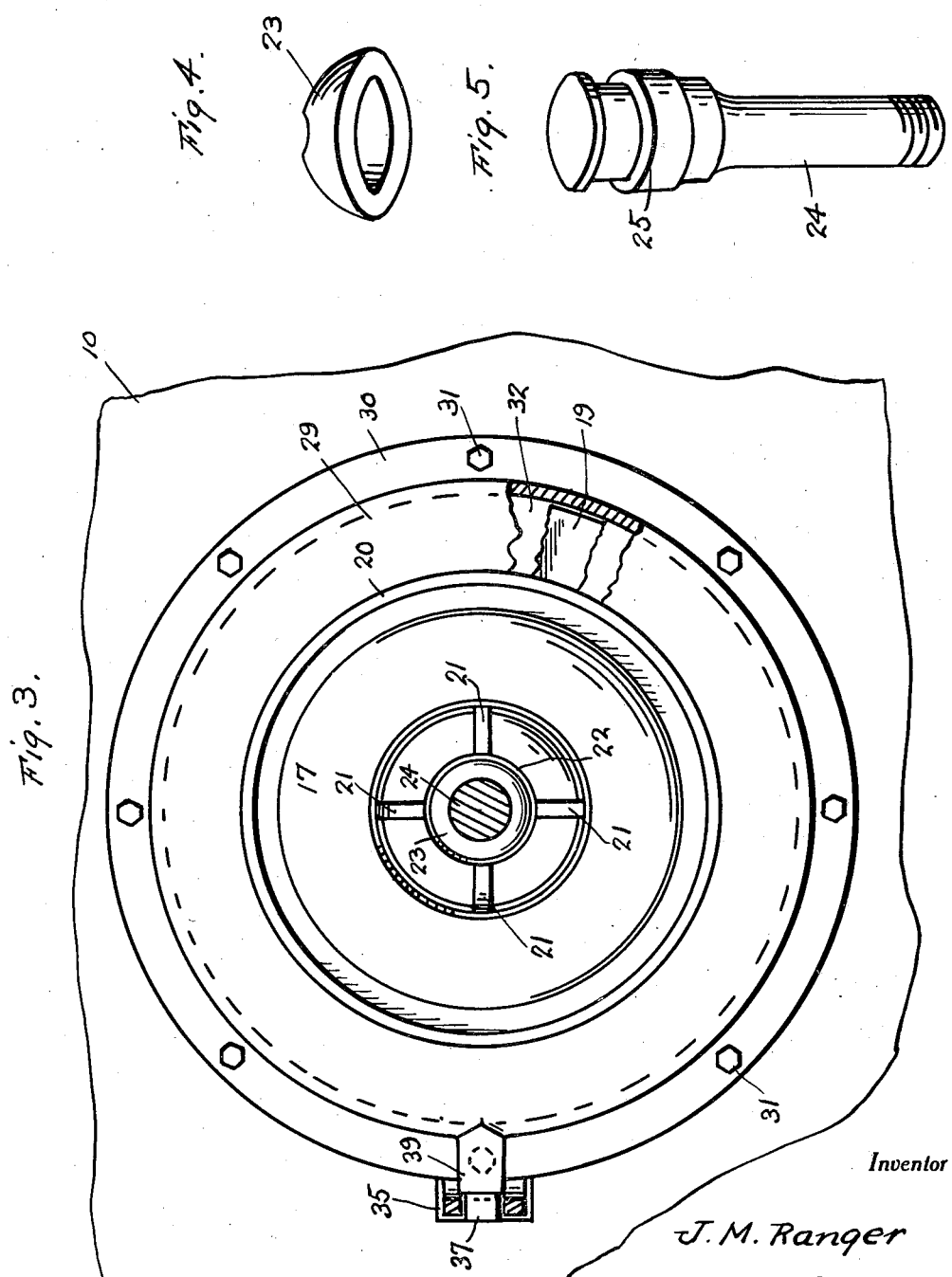

Inventor
J. M. Ranger
By Clarence A. O'Brien and
Hyman Berman
Attorneys

Patented June 15, 1937

2,084,291

UNITED STATES PATENT OFFICE 2,084,291

TRAILER HITCH

James M. Ranger, Muskegon, Mich.

Application April 25, 1936, Serial No. 76,453

10 Claims. (Cl. 280—33.1)

The present invention pertains to that particular classification of vehicle draft couplings and equivalent structures, and has specific reference to a so-called universal type fifth wheel or trailer hitch.

Needless to say, this field of invention is reasonably well developed but is nevertheless open to the entry therein of novel contributions possessed of needed refinements and improvements. Being generally conversant with the prior state of the art, I have discovered the need for a comparatively new fifth wheel construction possessed of appreciable distinction believed to be more aptly fitted for the specific purposes intended.

It follows, therefore, that my primary aim is to generally improve upon prior known marketed and patented draft couplings and similar flexible jointing connections between semi-trailers and lead or powered vehicles, such as tractors, by providing an arrangement contrastingly different as will be hereinafter exemplified.

Briefly and broadly stated, novelty is predicated upon a special adaptation of parts characterized by an adapter plate or base attachable to the tractor or power supply vehicle, and a complemental superimposed spaced parallel adapter plate for the overlying portion of the trailer, novel cushioning and universal jointing means being interposed between said adapter plates, whereby to allow this improved fifth wheel construction to accommodate and automatically adjust itself to substantially all road and travel conditions.

Other features and advantages including the unusual king pin arrangement, and concentric companion ball and socket means will become more readily apparent from the following description and drawings.

In the accompanying drawings, wherein like numerals are employed to designate corresponding mechanical details throughout the views:

Figure 1 is a top plan view of the improved tractor hitch or fifth wheel constructed in accordance with the specific principles of the present inventive conception;

Figure 2 is a substantially central vertical or longitudinal sectional view through Figure 1;

Figure 3 is a horizontal section, taken on the plane of the line 3—3 of Figure 2 looking downwardly in the direction of the arrows;

Figure 4 is a perspective view of a ball joint element hereinafter referred to as a part of the inner ball and socket joint;

Figure 5 is a perspective view of the especially designed king pin.

Figure 7:
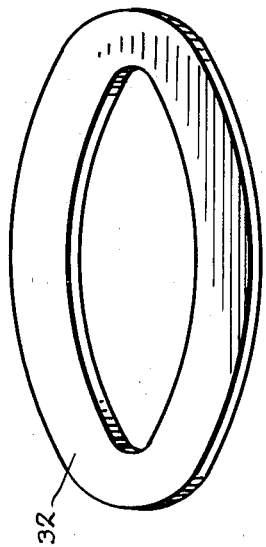
Figures 7 and 8 are perspective views of annular shock-absorbing cushions or rings.
Figure 8:
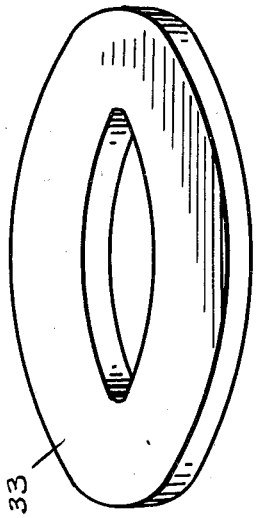

Attention is directed first to Figure 2 wherein the relatively fixed adapter plate or base is denoted by the numeral 10. This is suitably constructed and designed for connection to a tractor or other power supply and lead vehicle. The superposed complemental adapter plate is denoted by the numeral 11 and is in the form of a single casting, is designed for attachment to the semi-trailer and properly equipped to serve the special purposes for which it is herein intended. That is to say, it includes a disk porton 12 and a depending marginal rim or flange 13 and radial marginal extension 14 for proper adaptation and accommodation purposes. At its center it is apertured and provided with a bearing 15. Depending from the bearing and disposed in concentric relation thereto is a semi-spherical member 16 which may be conveniently referred to as a cap-like socket member. This fits over and has rockable contact with the companion truncated semi-spherical relatively stationary socket member 17.

Inasmuch as the part 17 functions as a hollow ball, it may be distinguished to advantage as the outer ball jointing element forming the dominating part of the mounting or unit 18. This part 18 comprises a single casting and includes an outstanding annular anchoring flange 19 having an upstanding radially inward abutment flange 20. On the interior of the ball jointing element 17 I provide a series of circumferentially spaced equidistant wings or webs 21 provided at their inner ends with an arcuate rigidly attached annulus 22. This forms an inner socket member and is designed to serve as a seat or socket for the spring supported relatively small semi-spherical ball jointing element 23.

Figure 9:
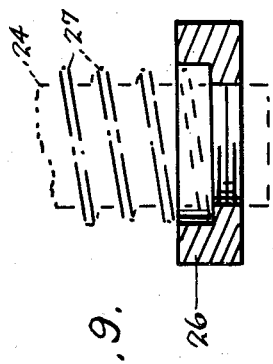
Figure 9 is a sectional view of the spring tensioning cupped nut.
Figure 6:
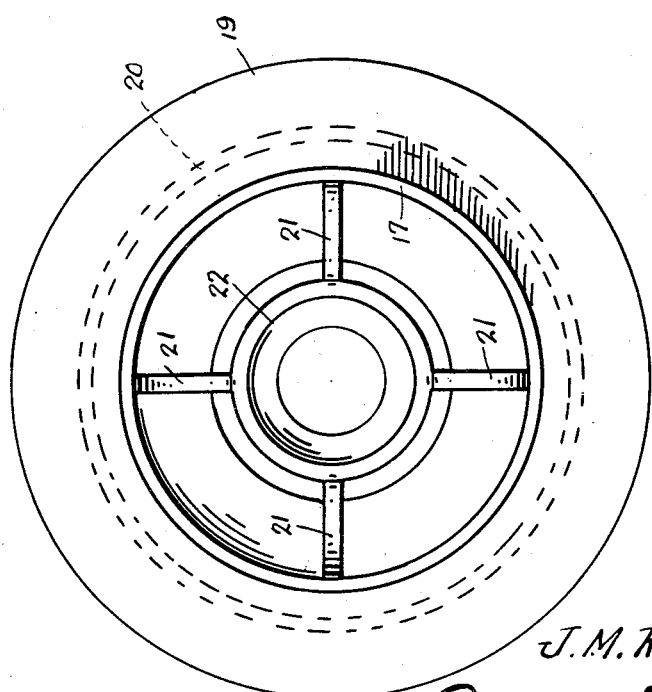
Figure 6 is a bottom plan view of the main jointing unit between the spaced parallel adapter plates.

Attention now comes to the centralized perpendicular king pin indicated by the numeral 24. This is properly shouldered as indicated at 25 provided with a head at the upper end to cooperate with the bearing 15 as well as the associated parts of the trailer (not shown). The king pin extends down through the bearing as well as through the inner and outer ball and socket joint passing down beyond the ball jointing element 23 where it is screw-threaded to accommodate a cupped adjusting nut 26 for the coiled spring 27. This spring surrounds the king pin and is located partly in the ball jointing element 23 and partly in the nut as indicated to advantage in Figure 9. The adapter plate 11, kingpin and nut as a unit have limited vertical bodily movement in relation to the relatively stationary mounting 18, which arrangement is calculated to provide the yielding and elastic properties needed for varying driving and road conditions. The sensitivity of action of these features is regulated by the adjustment of the nut 26 as is evident.

The mount or unit 18 is suitably attached to the base plate 10 by retention and cushioning means. The preferred embodiment includes an annular angle iron embodying an upstanding annular rim 28 and an inwardly extending flange 29 overlying the anchoring flange 19 and abutting the abutment flange 20. The numeral 30 designates an attaching lip which is bolted or otherwise secured as at 31 to the base plate 10. At this time I call attention to the cushioning means which comprises a rubber cushioning ring, there being a relatively thin ring 32 at the top interposed between the flanges 19 and 29, and a somewhat larger thicker ring 33 interposed between the flange 19 and the underlying plate 10. Incidentally, the plate 10 is apertured as at 34 to permit access to be had to the nut 26.

To prevent turning of the adapter plate 11 with respect to the plate 10 I provide a longitudinally bowed slotted bracket or fixture 35 bolted as at 36 to the under side of the plate 11 and eccentrically arranged. Cooperating with this is a keeper lug 37 which extends into the slot and which has a shank 38 threaded into a holding socket 39 on the cushion housing and attaching device secured to the plate 10.

By summation, structural novelty is thought to reside in the superposed spaced parallel adapter plates 10 and 11 with the interposed jointing universal type ball and socket means. Specifically, the means is believed to be novel in that it includes a relatively large outer ball and socket joint made up of the parts 16 and 17 and the complemental simultaneously operable inner concentric ball and socket joint made up of the parts 22 and 23. This provides the requisite universal tilting and rocking action needed for requisite compensating results. Novelty is further directed to the incorporation in this double ball and socket construction of the spring retained connecting or king pin 24 allowing the bodily lift of the adapter plate 11 independent of the plate 10 and the connecting means 18. Furthermore, novelty is attached to the part 18 of the flange 19 anchored on the plate 10 through the instrumentality of cushion equipped means adding further compensating properties to the device as a whole.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A universal type tractor and trailer hitch of the class described comprising a relatively fixed adapter plate for the tractor, a relatively movable adapter plate for the trailer, a centrally disposed perpendicular adjustable spring retained king pin connected to said trailer adapter plate permitting bodily movement of the king pin and trailer adapter plate in unison, and a universal jointing means between said plates and cooperable with said king pin.

2. In a structure of the class described, a lower adapter plate, an upper adapter plate disposed in spaced parallelism above the first named plate, inner and outer centralized concentric ball and socket jointing means between said plates, and an adjustable spring equipped king pin carried by the second named adapter plate and directly connected with the inner ball and socket joint.

3. In a structure of the class described, a lower adapter plate, an upper adapter plate disposed in spaced parallelism above the first named plate, inner and outer centralized concentric ball and socket jointing means between said plates, an adjustable spring equipped king pin carried by the second named adapter plate and directly connected with the inner ball and socket joint, together with cushioning and attaching means securing the outer ball and socket connection with said first named adapter plate.

4. In a structural assemblage of the class described, and as a component part of the complete combination, a tractor plate, a ball jointing unit embodying an outer hollow ball jointing member open at its bottom and top, said member being provided with internal radial webs, a part-spherical annulus connected to the inner ends of said webs in concentric arrangement with said ball jointing member, an anchoring flange carried by said ball jointing member, cushioning means engageable with said anchoring flange, and retention and housing means on said adapter plate enclosing the flange and said cushioning means.

5. As a component part of an assemblage of the class described, a trailer adapter plate comprising a body including a disk-like portion with a depending annular rim, provided at its center with a bearing and below said bearing with an integral semi-spherical socket element, a king pin mounted in said bearing and having a headed shoulder portion at its top above said plate, having its lower end screw-threaded and surrounded by a coiled spring, and a cupped adjusting and retention nut on said threaded end cooperable with said spring.

6. In a fifth wheel construction of the class described, a relatively fixed adapter plate for a tractor, a relatively movable adapter plate for a trailer disposed in superposed parallelism above the first-named adapter plate, a fixed outstanding guide and retention lug on said fixed adapter plate, a longitudinally curved and slotted bracket attached to said movable adapter plate and slidably connected with said lug, and ball and socket joining means interposed between and operatively connected with said adapter plates.

7. As a component part of an assemblage of the character described, an upper adapter plate comprising a body having top and bottom surfaces and having secured to its top at its vertical axis an upwardly extending trailer connecting king pin and having in radially spaced relation to said king pin a trailer supporting bearing and below said trailer supporting bearing at the bottom of the body a cup-like concave bearing member, engaged by a convex bearing member yieldingly supported on a lower adapter plate.

8. In an assemblage of the character described, the combination comprising upper and lower adapter plates, with the upper adapter plate having on its top an upwardly extending king pin and a trailer supporting bearing and at its bottom a downwardly extending inverted cup-like concave bearing having socketed therein an upwardly extending convex bearing member having a radially extending flange resiliently supported by the lower adapter plate.

9. In an assemblage of the character described, the combination comprising upper and lower adapter plates, with the upper adapter plate having on its top an upwardly extending king pin and a trailer supporting bearing and at its bottom a downwardly extending inverted cup-like concave bearing having socketed therein an upwardly extending convex bearing member resiliently supported by the lower adapter plate.

10. In an assemblage of the character described, the combination comprising upper and lower adapter plates, with the upper adapter plate having on its top an upwardly extending king pin and a trailer supporting bearing and at its bottom a downwardly extending inverted cup-like concave bearing having socketed therein an upwardly extending convex bearing member having a flange extending radially from its lower portion and engaged by resilient cushioning means carried by the lower adapter plate.

JAMES M. RANGER.